US009546895B2

(12) United States Patent
Flasza et al.

(10) Patent No.: US 9,546,895 B2
(45) Date of Patent: Jan. 17, 2017

(54) TIME DOMAIN REFLECTOMETRY BASED METHOD FOR EMULSION DETECTION AND PROFILING

(71) Applicant: Magnetrol International, Incorporated, Aurora, IL (US)

(72) Inventors: Michael D. Flasza, Schaumburg, IL (US); Feng Tang, Geneva, IL (US); Steven R. Page, Naperville, IL (US)

(73) Assignee: Magnetrol International, Incorporated, Aurora, IL (US)

( * ) Notice: Subject to any disclaimer, the term of this patent is extended or adjusted under 35 U.S.C. 154(b) by 761 days.

(21) Appl. No.: 14/039,536

(22) Filed: Sep. 27, 2013

(65) Prior Publication Data
US 2014/0085133 A1    Mar. 27, 2014

Related U.S. Application Data

(60) Provisional application No. 61/706,243, filed on Sep. 27, 2012.

(51) Int. Cl.
*G01S 13/88* (2006.01)
*G01F 23/284* (2006.01)
(52) U.S. Cl.
CPC ............. *G01F 23/284* (2013.01); *G01S 13/88* (2013.01)
(58) Field of Classification Search
CPC ................................ G01S 13/88; G01F 23/284
USPC ................................................... 342/22, 124
See application file for complete search history.

(56) References Cited

U.S. PATENT DOCUMENTS 3,474,337 A    10/1969  Petrik
3,812,422 A *  5/1974  De Carolis .......... G01F 23/284
                                                        324/642
4,544,880 A * 10/1985  Nagy .................... G01F 23/284
                                                        324/642
(Continued)

FOREIGN PATENT DOCUMENTS

WO    WO 2009/063497    5/2009
WO    WO 2012/052764    4/2012

OTHER PUBLICATIONS

Platt et al. Improving the Resolution of Non-Invasive Time Domain Reflectometry, 3rd Int'l Conference on Sensing Technology, Nov. 30, 2008.*

(Continued)

*Primary Examiner* — Peter Bythrow
(74) *Attorney, Agent, or Firm* — Wood, Phillips, Katz, Clark & Mortimer

(57) ABSTRACT

A radar transmitter for emulsion measurement comprises a probe defining a transmission line for sensing impedance. A pulse circuit is connected to the probe for generating pulses on the transmission line and receiving a reflected signal from the transmission line. The reflected signal comprises a waveform of probe impedance over time. A controller is operatively connected to the pulse circuit. The controller profiles content of the emulsion responsive to the waveform by transforming the waveform into impedance relative to distance, converting the transformed waveform into effective dielectric relative to distance, determining mixture content of the emulsion at select distances responsive to the effective dielectric at the select distances and developing an output representing mixture content relative to level units.

37 Claims, 9 Drawing Sheets

(56) References Cited

U.S. PATENT DOCUMENTS

| | | | | |
|---|---|---|---|---|
| 4,786,857 A * | 11/1988 | Mohr | G01F 23/284 | 324/643 |
| 4,991,915 A * | 2/1991 | Thompson | G01N 22/04 | 324/632 |
| 5,781,019 A * | 7/1998 | Telder | G01F 23/284 | 324/632 |
| 6,111,415 A * | 8/2000 | Moshe | G01N 22/04 | 324/640 |
| 6,707,307 B1 * | 3/2004 | McFarlane | G01N 22/00 | 324/617 |
| 7,239,150 B2 * | 7/2007 | Troxler | G01N 22/00 | 324/634 |
| 7,525,476 B1 * | 4/2009 | Delin | G01S 7/4056 | 324/600 |
| 7,542,866 B1 * | 6/2009 | Lovegren | G01F 23/284 | 340/618 |
| 2003/0002658 A1 * | 1/2003 | Belge | H04B 3/46 | 379/377 |
| 2003/0117150 A1 * | 6/2003 | Noik | B01D 19/0063 | 324/639 |
| 2004/0046571 A1 * | 3/2004 | Champion | G01F 23/284 | 324/637 |
| 2007/0279073 A1 * | 12/2007 | Wee | G01N 33/2823 | 324/639 |
| 2009/0145219 A1 * | 6/2009 | Champion | G01F 23/284 | 73/304 C |
| 2009/0153150 A1 * | 6/2009 | Slezak | G01F 23/266 | 324/663 |
| 2009/0158839 A1 * | 6/2009 | Spanke | G01F 23/284 | 73/290 V |
| 2010/0223011 A1 * | 9/2010 | Parsche | G01V 3/30 | 702/11 |
| 2013/0261977 A1 * | 10/2013 | Shanks | G01V 3/38 | 702/11 |
| 2014/0084945 A1 * | 3/2014 | Edvardsson | G01F 23/284 | 324/644 |
| 2014/0085133 A1 * | 3/2014 | Flasza | G01F 23/284 | 342/124 |
| 2015/0084809 A1 * | 3/2015 | Flasza | G01F 23/284 | 342/124 |

OTHER PUBLICATIONS

Platt et al. Improving the Resolution of Non-Invasive Time Domain Reflectometry, 3rd Int'l Conference on Sensing Technology, Nov. 30, 2008 [Retrieved Feb. 13, 2014 from Internet].

M. Johst et al.—"Reliability of Inversely Reconstructed Soil Moisture Profiles and Consequences for Field Applications", The Open Hydrology Journal, pp. 35-43.

Shang Chieh Wu—An Iterative Inversion Method for Transmission Line Fault Location, University of Utah, Aug. 2011.

* cited by examiner

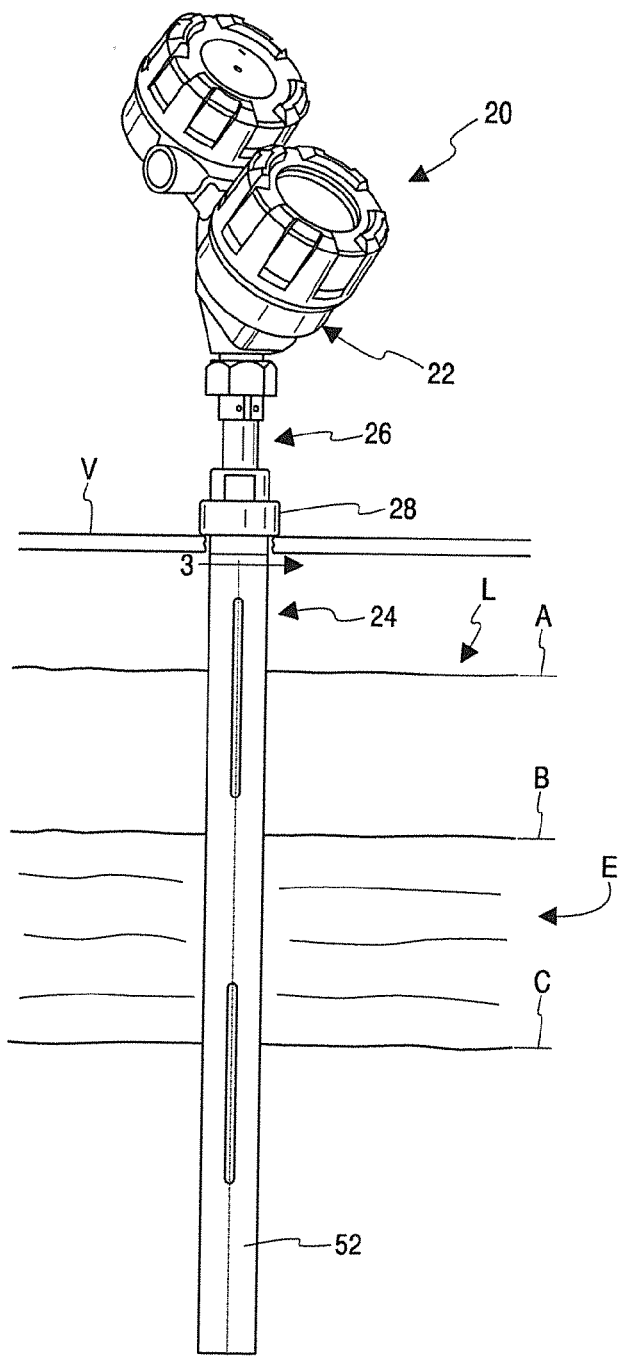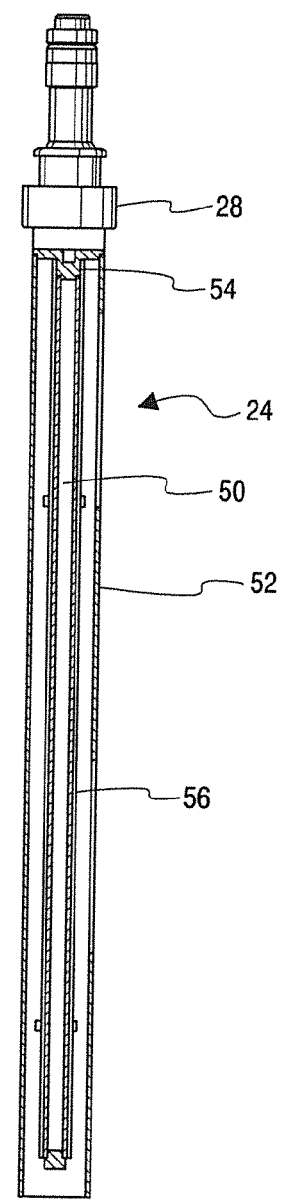
Fig. 1
Fig. 3

TIME DOMAIN REFLECTOMETRY BASED METHOD FOR EMULSION DETECTION AND PROFILING

CROSS-REFERENCE TO RELATED APPLICATIONS

This application claims priority of provisional application No. 61/706,243, filed Sep. 27, 2012.

FEDERALLY SPONSORED RESEARCH OR DEVELOPMENT

Not Applicable.

MICROFICHE/COPYRIGHT REFERENCE

Not Applicable.

FIELD OF THE INVENTION

This invention relates to process control instruments, and more particularly, to use of a time domain reflectometry based instrument for emulsion measurement and profiling.

BACKGROUND

Process control systems require the accurate measurement of process variables. Typically, a primary element senses the value of a process variable and a transmitter develops an output having a value that varies as a function of the process variable. For example, a level transmitter includes a primary element for sensing level and a circuit for developing an electrical signal proportional to sensed level.

Knowledge of level in industrial process tanks or vessels has long been required for safe and cost-effective operation of plants. Many technologies exist for making level measurements. These include buoyancy, capacitance, ultrasonic and microwave radar, to name a few. Recent advances in micropower impulse radar (MIR), also known as ultra-wideband (UWB) radar, in conjunction with advances in equivalent time sampling (ETS), permit development of low power and lost cost time domain reflectometry (TDR) instruments.

In a TDR instrument, a very fast pulse with a rise time of 500 picoseconds, or less, is propagated down a probe that serves as a transmission line, in a vessel. The pulse is reflected by a discontinuity caused by a transition between two media. For level measurement, that transition is typically where the air and the material to be measured meet. These instruments are also known as guided wave radar (GWR) measurement instruments.

One type of probe used by GWR level instruments is the coaxial probe. The coaxial probe consists of an outer tube and an inner conductor. When a coaxial probe is immersed in the liquid to be measured, there is a section of constant impedance, generally air, above the liquid surface. An impedance discontinuity is created at the level surface due to the change in dielectric constant of the liquid versus air at this point. When the GWR signal encounters any impedance discontinuity in the transmission line, part of the signal is reflected back toward the source in accordance with theory based on Maxwell's laws. The GWR instrument measures the time of flight of the electrical signal to, and back from, this reflecting point, being the liquid surface, to find the liquid level.

Simple level measurement involves detecting the reflected signal from a single level surface, such as water or oil. A slightly more complex measurement is so-called "interface" measurement, in which a less dense medium such as oil floats on top of a heavier medium such as water.

In many industrial processes, such as crude oil processing, tanks may contain both oil and water. However, the boundary between the oil and water may be poorly defined due to mixing of oil and water at the boundary. Instead of being sharp and well-defined, a layer of variable, potentially large, thickness consisting of an oil/water mix may exist. This "emulsion" layer typically starts out as a high percentage of oil mixed with a small percentage of water near the top. The percentage of water in the mix generally increases until the percentage of water in the mix is high and the percentage of oil low near the bottom of the emulsion layer, eventually becoming all water and no oil. Advantageously, it is desired to profile the emulsion as by measuring the oil/water mix inside the emulsion.

GWR is a good technology for so-called "interface" applications. However, conventional GWR struggles when an "emulsion" layer (a layer consisting of a mixture of oil and water) is present, because the boundary between the oil and water is no longer sharp or well-defined. The emulsion layer is comprised of a varying percentage of oil/water, and may be due to turbulence, mixing, etc., or simply being pumped from the ground that way. Emulsions can happen very frequently in oil-water processing at industrial plants (for example, crude oil processing). The emulsion layer thickness in these applications can range from an inch or less to nearly the entire height of the tank (40 feet or more).

While GWR provides a very desirable solution to simple level measurement and "clean interface" applications, GWR solutions to the emulsion measurement problem have been elusive. Difficulties arise in producing a measurable signal with conventional GWR when no distinct impedance change exists in the process due to the presence of the emulsion layer.

There would be significant commercial benefit to an emulsion measurement device that would operate in the same manner as, and have the benefits of, the well-known guided wave principles. The costs of known solutions to the emulsion measurement problem are very large (a nuclear-technology based emulsion measurement device can approach $100,000 in instrument cost). Another device promoted for use with emulsions is not only expensive but is simply a point-level sensor, incapable of "profiling" or continuous emulsion measurement. A "profiling" system is one in which the oil/water percentage in the emulsion can be detected and reported with good resolution over the length of the probe (and therefore the entire height of the tank or process).

This application is directed to improvements in emulsion measurement and profiling.

SUMMARY

As described herein, an emulsion, such as a variable oil and water mixture, in an industrial level measurement application can be sensed, measured and profiled by a system using principles of time domain reflectometry (TDR). The system uses a probe and electronics capable of TDR measurements and software algorithms to convert a TDR waveform into effective dielectric and compensated time of flight measurements.

Broadly, there is disclosed in accordance with one aspect, a radar transmitter for emulsion measurement comprising a probe defining a transmission line for sensing impedance. A pulse circuit is connected to the probe for generating pulses on the transmission line and receiving a reflected signal from the transmission line. The reflected signal comprises a waveform of probe impedance over time. A controller is operatively connected to the pulse circuit. The controller profiles content of the emulsion responsive to the waveform by transforming the waveform into impedance relative to distance, converting the transformed waveform into effective dielectric relative to distance, determining mixture content of the emulsion at select distances responsive to the effective dielectric at the select distances and developing an output representing mixture content relative to level units.

There is disclosed in accordance with another aspect a TDR measurement instrument for emulsion measurement comprising a probe defining a transmission line for sensing impedance. A pulse circuit is connected to the probe for generating pulses on the transmission line and receiving a reflected signal from the transmission line. A signal processing circuit is connected to the pulse circuit for developing a time representation of the reflected signal. A database stores data representing percentage mixtures of fluids in an emulsion and corresponding electrical properties of the emulsion. A controller is operatively connected to the signal processing circuit and the database. The controller models the probe as a plurality of small segments of fluid and uses a model determination module to adjust percentage mixtures of fluids in each segment and use the corresponding electrical properties to develop a simulated waveform to closely match the reflected signal to determine mixture content of the emulsion at select distances and develop an output representing mixture content relative to level units.

There is disclosed in accordance with another aspect a TDR measurement instrument for emulsion measurement comprising a probe defining a transmission line for sensing impedance. A pulse circuit is connected to the probe for driving the probe through a driving impedance. A reflection measurement device receives a reflected signal from the probe representing impedance changes on the transmission line. A forward model simulator develops a simulated pulse output representing estimate of probe output for percentage mixtures of fluids. A comparison module operatively connected to the reflection measurement device and the forward model simulator compares iterations of the reflected signal to the simulated pulse output to obtain a closest match for plural segments of the probe. A model determination module is operatively associated with the comparison module to determine mixture content of the emulsion at select distances and develop an output representing mixture content relative to level units.

There is also disclosed herein a method for measuring and profiling mixture content of an emulsion in a process vessel comprising providing a probe defining a transmission line extending into the process vessel for sensing impedance of an emulsion in the process vessel; generating pulses on the transmission line and receiving a reflected signal from the transmission line, the reflected signal comprising a waveform of probe impedance over time; and operating a controller, receiving the reflected signal, the controller profiling content of the emulsion responsive to the waveform by transforming the waveform into impedance relative to distance, converting the transformed waveform into effective dielectric relative to distance, determining mixture content of the emulsion at select distances responsive to the effective dielectric at the select distances and developing an output representing mixture content relative to level units.

There is further disclosed a method for measuring and profiling mixture content of an emulsion in a process vessel using time domain reflectometry comprising providing a probe defining a transmission line extending into the process vessel for sensing impedance of an emulsion in the process vessel; driving the probe through a driving impedance; receiving a reflected signal from the probe representing impedance changes on the transmission line; developing a simulated pulse output representing estimate of probe outputs for percentage mixtures of fluids; comparing iterations of the reflected signal to the simulated pulse output to obtain a closest match for plural segments of the probe; and determining mixture content of the emulsion at select distances and developing an output representing mixture content relative to level units.

Other features and advantages will be apparent from a review of the entire specification, including the appended claims and drawings.

BRIEF DESCRIPTION OF THE DRAWINGS

FIG. 1 is an elevation view of a guided wave radar instrument for emulsion detection and profiling;

FIG. 2 is a block diagram of the instrument of FIG. 1;

FIG. 3 is a cross-section of the probe for the instrument of FIG. 1 taken along the line 3-3 of FIG. 1;

DETAILED DESCRIPTION

Figure 4:
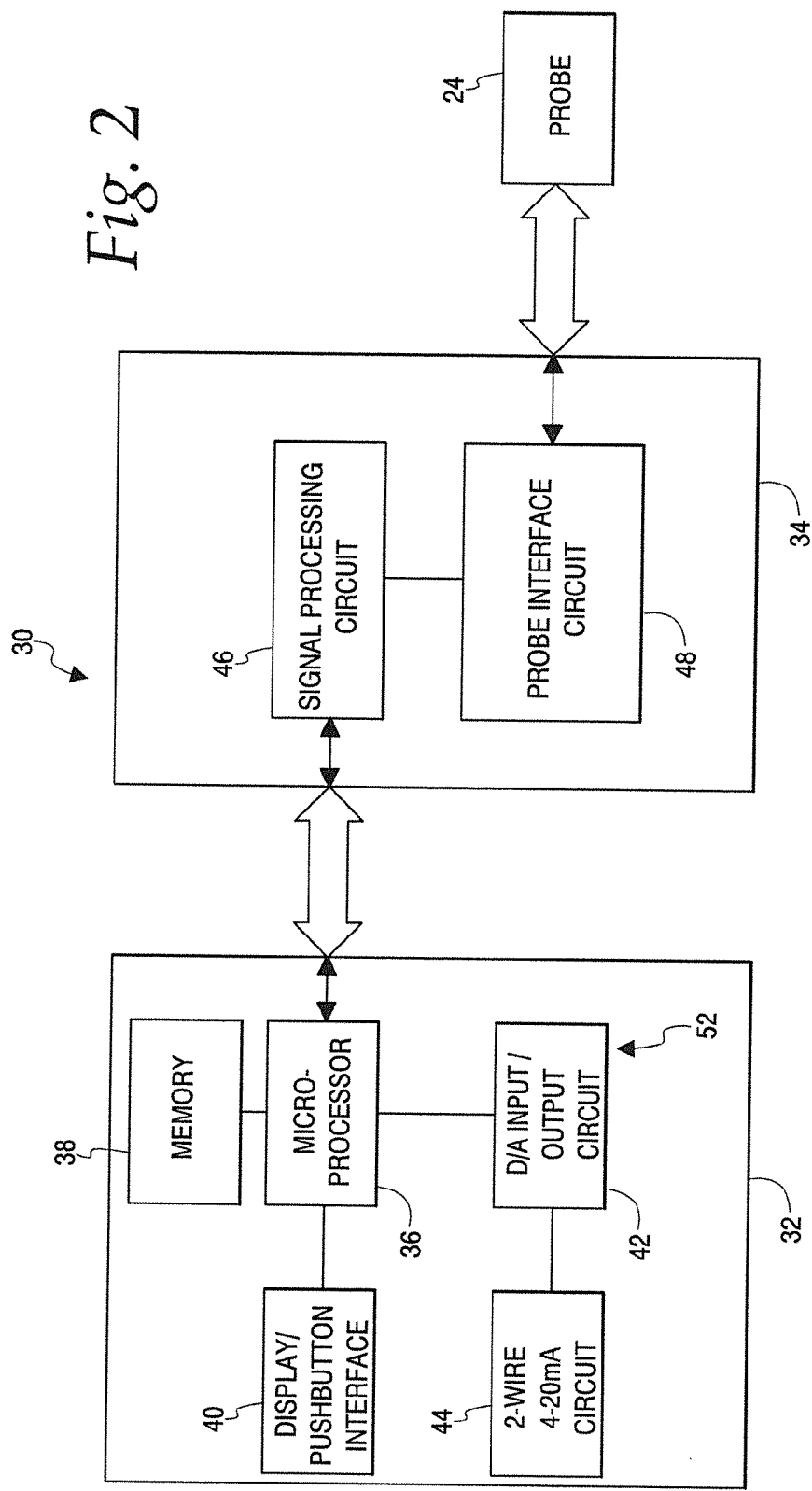
FIG. 4 is a block diagram of a simulation model comprising the guided wave radar instrument immersed in a tank containing multiple fluids.

Referring to FIG. 1, a process instrument 20 is illustrated. The process instrument 20 uses pulsed radar in conjunction with equivalent time sampling (ETS) and ultra-wide band (UWB) transceivers for measuring level using time domain reflectometry (TDR). Particularly, the instrument 20 uses guided wave radar for sensing level. While the embodiment described herein relates to a guided wave radar level sensing apparatus, various aspects of the invention may be used with other types of process instruments for measuring various process parameters. For example, the instrument 20 could use a step excitation TDR signal or a pulsed continuous wave radar signal.

The process instrument 20 includes a control housing 22, a probe 24, and a connector 26 for connecting the probe 24 to the housing 22. The probe 24 is mounted to a process vessel V using an adaptor 28 that is part of the connector 26. The housing 22 is then secured to the probe 24 as by threading the connector 26 to the housing 22. The probe 24 comprises a high frequency transmission line which, when placed in a fluid, can be used to measure level of the fluid.

Particularly, the probe 24 is controlled by a controller 30, described below, in the housing 22 for determining level in the vessel V.

As described more particularly below, the controller 30 generates and transmits a signal on the probe 24. A reflected signal is developed at any impedance change. The instrument 20 is used herein for emulsion measurement and profiling. In an illustrative embodiment, the instrument 20 is described in connection with an oil layer above a water layer, with an emulsion layer of oil and water therebetween. Particularly, as illustrated in FIG. 1, the vessel V is illustrated containing a liquid L comprising an upper liquid surface at A for an oil layer, a level at B for the top of an emulsion layer E and a level at C for the bottom of the emulsion layer E and thus also the top of the water layer. Thus, the area between levels A and B represents oil, between levels B and C the emulsion, and below C is water. The process instrument 20 is adapted to measure and profile the oil/water mix inside the emulsion E.

Guided wave radar combines TDR, ETS and low power circuitry. TDR uses pulses of electromagnetic (EM) energy to measure distanced or levels. When a pulse reaches a dielectric discontinuity then a part of the energy is reflected. The greater the dielectric difference, the greater the amplitude of the reflection. In the measurement instrument 20, the probe 24 comprises a wave guide with a characteristic impedance in air. When part of the probe 24 is immersed in a material other than air, there is lower impedance due to the increase in the dielectric. Then the EM pulse is sent down the probe it meets the dielectric discontinuity, a reflection is generated.

ETS is used to measure the high speed, low power EM energy. The high speed EM energy (1000 foot/microsecond) is difficult to measure over short distances and at the resolution required in the process industry. ETS captures the EM signals in real time (nanoseconds) and reconstructs them in equivalent time (milliseconds), which is much easier to measure. ETS is accomplished by scanning the wave guide to collect thousands of samples. Approximately five scans are taken per second.

Referring to FIG. 2, the electronic circuitry mounted in the housing 22 of FIG. 1 is illustrated in block diagram form as an exemplary controller 30 connected to the probe 24. As will be apparent, the probe 24 could be used with other controller designs. The controller 30 includes a digital circuit 32 and an analog circuit 34. The digital circuit 32 includes a microprocessor 36 connected to a suitable memory 38 (the combination forming a computer) and a display/push button interface 40. The display/push button interface 40 is used for entering parameters with a keypad and displaying user and status information. The memory 38 comprises both non-volatile memory for storing programs and calibration parameters, as well as volatile memory used during level measurement. The microprocessor 36 is also connected to a digital to analog input/output circuit 42 which is in turn connected to a two-wire circuit 44 for connecting to a remote power source. Particularly, the two-wire circuit 44 utilizes loop control and power circuitry which is well known and commonly used in process instrumentation. The two-wire circuit 44 controls the current on the two-wire line in the range of 4-20 mA which represents level or other characteristics measured by the probe 24.

The microprocessor 36 is also connected to a signal processing circuit 46 of the analog circuit 34. The signal processing circuit 46 is in turn connected via a probe interface circuit 48 to the probe 24. The probe interface circuit 48 includes an ETS circuit which converts real time signals to equivalent time signals, as discussed above. The signal processing circuit 46 processes the ETS signals and provides a timed output to the microprocessor 36, as described more particularly below.

The general concept implemented by the ETS circuit is known. The probe interface circuit 48 generates hundreds of thousands of very fast pulses of 500 picoseconds or less rise time every second. The timing between pulses is tightly controlled. The reflected pulses are sampled at controlled intervals. The samples build a time multiplied "picture" of the reflected pulses. Since these pulses travel on the probe 24 at the speed of light, this picture represents approximately ten nanoseconds in real time for a five-foot probe. The probe interface circuit 48 converts the time to about seventy-one milliseconds. As is apparent, the exact time would depend on various factors, such as, for example, probe length. The largest signals have an amplitude on the order of twenty millivolts before amplification to the desired amplitude by common audio amplifiers. For a low power device, a threshold scheme is employed to give interrupts to the microprocessor 36 for select signals, namely, fiducial, target, level, and end of probe, as described below. The microprocessor 36 converts these timed interrupts into distance. With the probe length entered through the display/push button interface 40, or some other interface, the microprocessor 36 can calculate the level by subtracting from the probe length the difference between the fiducial and level distances. Changes in measured location of the reference target can be used for velocity compensation, as necessary or desired.

Referring to FIG. 3, the probe 24 comprises a center conductor 50, which may be a solid rod or a tube, coaxially received in an outer tube 52. The center conductor 50 and outer tube 52 are typically constructed of stainless steel, although other materials may be used. The center conductor 50 is connected via a connector 54 to an electrical conductor (not shown) for connection to the controller 30. The outer tube 52 is electrically connected in a known manner, such as via the connector 26 and housing 22 to the controller 30. In order to provide improved emulsion measurement and profiling the inner conductor 50 may be coated with a thin insulating sleeve 56. The sleeve 56 may be, for example, a TEFLON® coating in the range of 0.015" to 0.125" thick.

Time Domain Reflectometry (TDR) is a well known technique that measures the characteristic impedance of a transmission line by measurement of reflections from impedance discontinuities. TDR forms the basis of conventional GWR level measurement. Basic TDR techniques, as used in conventional level measurement devices, are able to sense abrupt changes in impedance such as those formed by clear, sharp liquid surfaces. When the transition in characteristic impedance of the transmission line is gradual (as in emulsions), more sophisticated forms of TDR (i.e. laboratory instruments) can be used to measure and report the precise characteristic impedances vs. time of the transmission line. These laboratory instruments differ from "basic" TDR in that their hardware and software designs are more complex. Via this hardware and software, high quality TDR instruments can give a true picture of the actual characteristic impedances of a transmission line, whether the actual impedance changes along the line are sharp, very gradual, or anything in between.

A typical probe used in GWR level measurement is the coaxial probe 24, as described above. This probe structure defines a transmission line with a characteristic impedance that can be calculated from the inner rod diameter, the inner diameter of the outer tube, and the dielectric constant of the material inside the probe 24. The probe 24 is inserted into the tank and immersed in the liquid(s) to be measured.

The formula to compute the characteristic impedance is well known. The most important fact about this formula is that if the dielectric constant (relative permittivity, k) of the medium inside the probe changes, the characteristic impedance will change. If the change in dielectric constant is abrupt, as in simple level or clean interface applications, then the characteristic impedance will change abruptly at those points. If the dielectric change inside the probe is gradual, the characteristic impedance of the probe will change gradually as well, but still nonetheless will change.

The dielectric constant of an oil/water mix is a predictable parameter based on the relative percent of oil and water in the mix (emulsion). When the variable dielectric constant of the oil/water mix fills a GWR coaxial probe 24, the characteristic impedance along the probe 24 is an indication of the oil/water percentage mix. While conventional GWR instruments do not handle the gradual change in impedance of a level probe in an emulsion well, more sophisticated TDR methods, such as those available in laboratory instruments, can report the characteristic impedance vs. time of the probe accurately. The true impedance along the probe is an indication of the oil/water mix percentage and from this data, the emulsion boundaries can be identified and the percent of oil/water in the emulsion mix can be calculated and reported.

The embodiment described herein relates to an emulsion in the form of a mix of oil and water. The systems and methods described herein can be used to measure and profile the mixtures of other liquids in order to determine mixture content of the emulsion at select distances and developing an output representing mixture content relative to level units. However, water and oil in an emulsion is one that is commonly measured and for simplicity will be described herein.

The probe is a key element in the measurement system when attempting to measure and profile practical applications. The probe may be coaxial, as described herein, but other probe types may work as well, such as twinlead or single-conductor probes also common in the industry. The TDR method of measuring and profiling emulsions, as described herein, will work with other probes that are responsive to impedance changes of the surrounding medium. The technique is not, therefore, limited to coaxial probes though that is the example used herein.

An echo waveform from a conventional GWR instrument will show easily-identified negative-going pulses represent an upper (oil) level and an oil/water interface. However, when an emulsion layer is produced by mixing of the oil/water interface point, the upper (oil) level is easily identified but the emulsion produces garbled, unpredictable shapes as the emulsion characteristics vary. Two, three or sometimes no additional waveform features are produced. There appears to be little correlation of the observed emulsion layer with the associated waveform region. These waveforms are difficult or impossible to translate into emulsion thickness and/or percent of oil/water mix.

Emulsions show a characteristic impedance of the probe to be about 55 ohms for the section in air. The characteristic impedance is about 45 ohms in oil (consistent with the formulas for the known dielectric of oil), then decreases gradually through the emulsion to about 8 ohms under water (consistent with the known dielectric of water).

As described herein, an industrial level measurement instrument is configured to interpret the gradual impedance change through the emulsion by custom software algorithms. The described software algorithms break the measurement range down into a series of smaller segments and compensate for the time of flight delay in each small segment. This allows calculation of the actual emulsion height. Conversion tables convert the effective dielectric constant, as measured by the TDR, into an approximate percentage of oil in water (or water in oil) at the various points in the emulsion (the desired "profile").

As explained above, a true TDR instrument, when used with a coaxial probe inserted into a tank having oil/emulsion/water layers, returns a waveform which gives characteristic impedance vs. time of the transmission line (probe). Using the coaxial probe formula for characteristic impedance vs. dielectric, the TDR curve can be converted into dielectric vs. time at any point along the probe. However, the user wants the information in terms of physical level in the tank—in other words, upper level, emulsion top/bottom, water layer, etc. in terms of the tank height—inches, feet, meters, etc. The level measurement system must convert the TDR measurement units of time into actual distance (or level) in the tank.

It is well known that the radar signal propagates more slowly through the liquid as the dielectric increases. In simple interface applications, the user needs to tell the instrument the dielectric constant of the upper layer, so that the oil/water interface level (in level units) can be computed accurately. This requires compensation for the slower time of flight through the oil layer. In simple interface situations, if the upper dielectric is known, this compensation is relatively straightforward.

Emulsion measurement is more challenging. As the emulsion layer is a gradual impedance change (of variable profile) from oil to water, compensating the time of flight through this layer (essential to converting the TDR waveform to actual level units) is more complicated.

The software algorithm used herein to perform this compensation on an emulsion is called TDR inversion. This method takes a TDR waveform as produced by the instrument and mathematically converts it into N small segments consisting of transmission line models built as equivalent sections of R (resistance), L (inductance) and C (capacitance). The model produces the equivalent of electrical length for each segment, thereby allowing conversion of the waveform into actual length vs. impedance data.

A summary of how the device works is as follows: 1. Obtain waveform scan of tank via TDR (probe impedance vs. time); 2. Use TDR Inversion software technique to transform TDR curve into impedance vs. actual distance; 3. Convert this curve into effective dielectric vs. distance; 4. Convert curve into percent of oil/water vs. distance; and 5. Display curve of oil, oil/water % (emulsion), water in tank in actual level units.

FIG. 4 is a functional block diagram illustrating operation of an emulsion profiling system 100 implemented using the controller 30, see FIG. 2, for emulsion measurement and profiling. The system 100 comprises a pulse generator 102 which drives the probe 24 through a driving impedance 104. A reflection measurement device 106 receives the reflected signal from the probe 24. The reflected signal represents the impedance changes. The reflected signal is supplied to a measured/simulated comparison module 108 which compares the reflected signal to a signal from a forward simulator block 110. An output of the block 108 is supplied to a model determination module 112 which develops the output to an output device 114. This output is also provided to the forward model simulator block 110.

Figure 5:
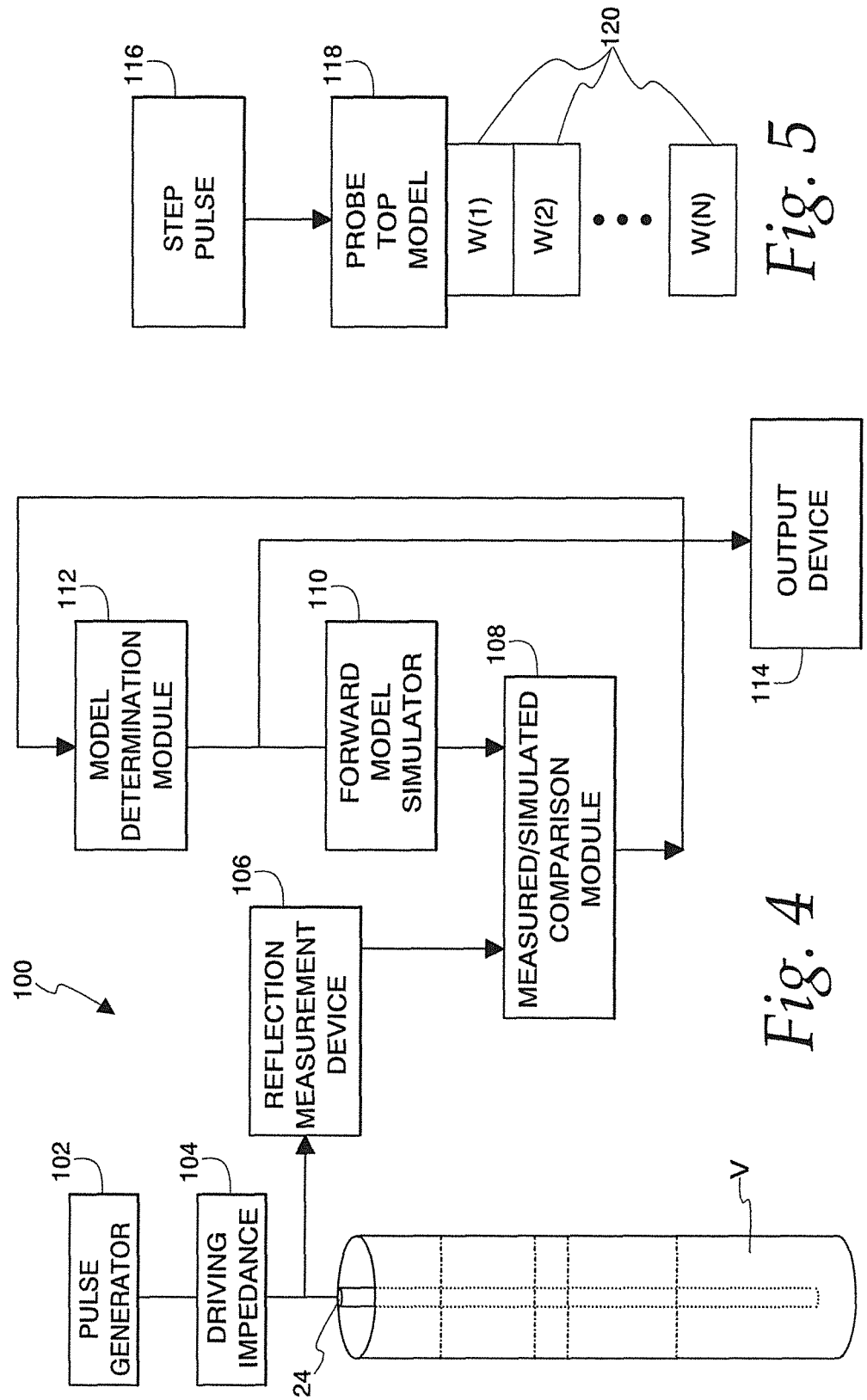
FIG. 5 is a block diagram of the simulation model of FIG. 4.

A probe model comprising N segments, of possibly differing hydration, is illustrated in FIG. 5. A step pulse 116 is applied to a probe top model 118 and then to probe segments 120, each designated as W(1), W(2) ... W(N). Each segment is an imagined length of the probe model, not a physical part of the actual probe 24. As described herein, each segment is modeled as a 2-port network, and an ABCD matrix is used to represent that network's electrical transmission characteristics.

Figure 11:
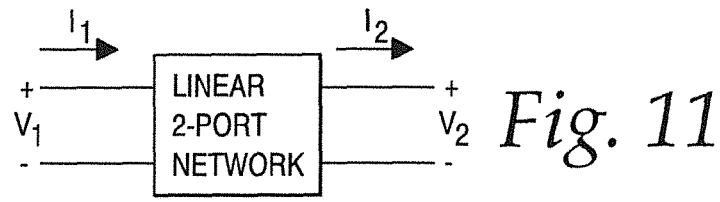
FIG. 11 illustrates voltages and currents for a 2-port network.

In general, and as discussed in Collin, R. (1966) *Foundations for Microwave Engineering*, an ABCD matrix, sometimes called a transmission matrix, describes the transfer functions of a two-port network. For example, and as illustrated in FIG. 11, the relation between the input and output voltages and currents of the two-port network is expressed in terms of the matrix-vector equation:

$$\begin{bmatrix} V_1 \\ I_1 \end{bmatrix} = \begin{bmatrix} A & B \\ C & D \end{bmatrix} \begin{bmatrix} V_2 \\ I_2 \end{bmatrix}$$

The complex quantities A, B, C and D are functions of frequency as are the voltages and currents.

Figure 12:
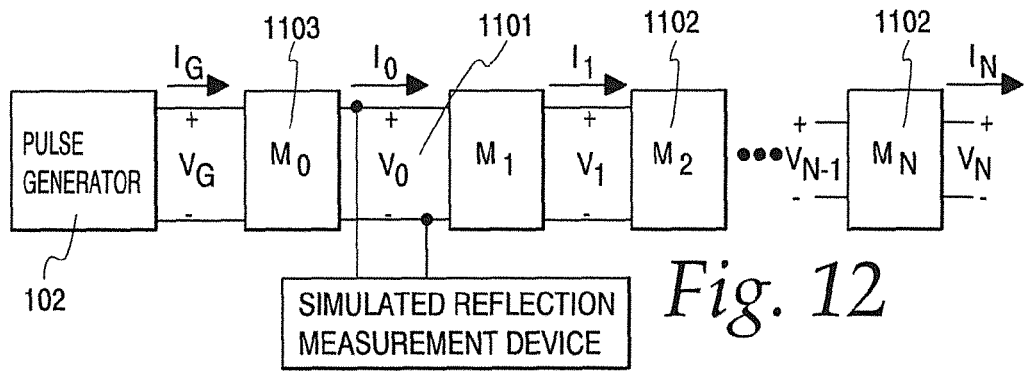
FIG. 12 Illustrates concatenation of 2-port networks.

ABCD matrix representation allows cascaded series two-port networks to be easily represented. For example, as illustrated in FIG. 12, a series of two-port networks can be multiplied together resulting in the ABCD matrix of the series. In particular, multiplying the ABCD matrices $M_i$ of each of individual two-port network results in the ABCD matrix of the series in accordance with:

$$\begin{bmatrix} A & B \\ C & D \end{bmatrix}_{Cascade} = \begin{bmatrix} A & B \\ C & D \end{bmatrix}_1 \begin{bmatrix} A & B \\ C & D \end{bmatrix}_2 \begin{bmatrix} A & B \\ C & D \end{bmatrix}_3 \begin{bmatrix} A & B \\ C & D \end{bmatrix}_4 \cdots = \prod_{i=1}^{n} M_i$$

The ith segment 120, see FIG. 5, is essentially a two-port network which can be described by an ABCD matrix $M_i$. For example, a segment with propagation constant y(f) and impedance Z(f) and length l has the following ABCD matrix, as discussed in Zhang, J. (2010) Causal RLGC(f) Models for Transmission Lines From Measured S-Parameters. *Electromagnetic Compatibility, IEEE Transactions on, vol. 52, no. 1,* 189-198:

$$\begin{bmatrix} V_1 \\ I_1 \end{bmatrix} = \begin{bmatrix} \cosh(\Gamma l) & Z\sinh(\Gamma l) \\ \frac{\sinh(\Gamma l)}{Z} & \cosh(\Gamma l) \end{bmatrix} \begin{bmatrix} V_2 \\ I_2 \end{bmatrix}$$

A two port network for a series impedance Z, such as FIG. 4's driving impedance 104, also shown in FIG. 12 as 1103, can be represented with an ABCD matrix as follows:

$$\begin{bmatrix} V_1 \\ I_1 \end{bmatrix} = \begin{bmatrix} 1 & Z \\ 1 & 1 \end{bmatrix} \begin{bmatrix} V_2 \\ I_2 \end{bmatrix}$$

FIG. 12 shows the complete ABCD model for the system. The forward model simulator 110, see FIG. 4, output is voltage $V_0$ in FIG. 12. The system model is solved for $V_0$, so that given some set of {M2, ..., Mn}, which are ABCD matrices 1102, the algorithm can model the TDR waveform, providing a modeled waveform to the measured/simulated comparison module 108. The software algorithm used herein solves for $V_0$ as taught in Wu, S. C. (2011, August). AN ITERATIVE INVERSION METHOD FOR TRANSMISSION LINE FAULT LOCATION. *PhD Thesis*. University of Utah), as follows:

$$\begin{bmatrix} A_x & B_x \\ C_x & D_x \end{bmatrix} = \prod_{i=1}^{N} M_i$$

$$\begin{bmatrix} A_y & B_y \\ C_y & D_y \end{bmatrix} = \prod_{i=0}^{N} M_i$$

$$\begin{bmatrix} V_0 \\ I_0 \end{bmatrix} = \begin{bmatrix} A_x & B_x \\ C_x & D_x \end{bmatrix} \begin{bmatrix} V_N \\ I_N \end{bmatrix}$$

$$\begin{bmatrix} V_G \\ I_G \end{bmatrix} = \begin{bmatrix} A_y & B_y \\ C_y & D_y \end{bmatrix} \begin{bmatrix} V_N \\ I_N \end{bmatrix}$$

$$V_0 = A_x \times V_N + B_x \times I_N$$

$$V_G = A_y \times V_N + B_y \times I_N$$

$I_N = 0$ (Because Open circuit at end of probe)

$$V_0 = \frac{A_x}{A_y} V_G$$

FIG. 12 shows that $V_0$ is the output of the pulse generator 102, which is a voltage source with known, constant pulse shape. The pulse shape is preferably a step, but can be any shape, as long as the actual shape is known. Finally, the algorithm has a modeled TDR trace:

$$V_0(t) = iFFT\left(V_G \times \frac{A_x}{A_y}\right)$$

Where iFFT denotes the inverse Fourier Transform from (Press, W. H. (1992). *Numerical Recipies in C*), converting the frequency-domain functions to the time-domain. $V_0(t)$ is the output of the forward model simulator 110.

The analysis above used given {Z,Γ,l}. {l} is the fixed, known, physical length of a segment 120. Following is a method for determining a segment's frequency-dependent {Z,Γ} given the percent water in that segment's fluid. The algorithm starts with the model from Zhang, 2010 (cited above):

$$\Gamma = \sqrt{(R + j\omega L)(G + j\omega C)}$$

$$Z = \sqrt{\frac{R + j\omega L}{G + j\omega C}}$$

$$R = R_0 + \sqrt{f} R_s$$

$$L = L_\infty + R_s / (2\pi\sqrt{f})$$

$$G = G_0 + 2\pi f K_g \varepsilon_{imaginary}$$

$$C = K_g \varepsilon_{real}$$

$$\varepsilon = \varepsilon_\infty + \frac{A}{1 + j\omega\tau}$$

Since the probe 24 is coaxial, the algorithm uses the standard formulas from Collin, 1966 (cited above):

$$K_g = \frac{2\pi\varepsilon_0}{\ln(b/a)}$$

$$L_\infty = \frac{\mu}{2\pi}\ln(b/a)$$

The probe 24 is made of non-magnetic Stainless Steel, which leads to $R_0$ and $R_s$, DC resistance and skin-effect resistance.

Taken in total:

$$[\Gamma(\omega), Z(\omega)] = f(A, \in_\infty, \tau, \omega)$$

The dielectric model above comprises the Debye-Relaxation complex-dielectric-model. R Somaraju, J. T. (2006), "Frequency, temperature and salinity variation of the permittivity of seawater", *IEEE Transactions on Antennas and Propagation* 54 (11), 3441-3448 teaches that the Debye equation is appropriate to model the electrical properties of water over the frequency band of interest, <2 Ghz. (Zhang, 2010) teaches that the Debye equation models non-ionic dielectrics also, like printed circuit board material, which behaves like oil. The fluid containing tank V will have oil, water and emulsion mixtures of those. It has been found that for a particular percent water, there exists an optimal $\{A, \in_\infty, \tau\}$ which models the actual TDR pulse sufficient for measurement and profiling requirements. As such, the algorithm is used to find optimal Debye parameters.

Since the algorithm models the hydrated dielectric with Debye Relaxation, it is only necessary to find the three scalar quantities $\{A, \in_\infty, \tau\}$ for the fluid in a segment, and that gives the entire ABCD matrix for that segment. Because the software is modeling a range of fluids with various percent water, it is necessary to find $\{A, \in_\infty, \tau\}$ as a function of percent water.

The forward model simulator 110 focuses on a single simulated segment in that model. It uses an empirical technique to find a continuous function F:

$$\{A(W), \varepsilon_\infty(W), \tau(W)\} = F(W)$$

$$W = -10 \quad \text{Air}$$
$$W = 0 \quad \text{Oil}$$
$$W = 100 \quad \text{Water}$$

It is obvious that above the highest segment 120 there will be air. In order to represent air, W is allowed to continue beyond pure oil (W=0), into negative territory, which is defined as a sort of Air/Oil mixture. This could possibly be foam on top of the oil, or it could be an abrupt transition from oil to air. This is done so that the single quantity W represents the continuum through air, oil and water.

Figure 6:
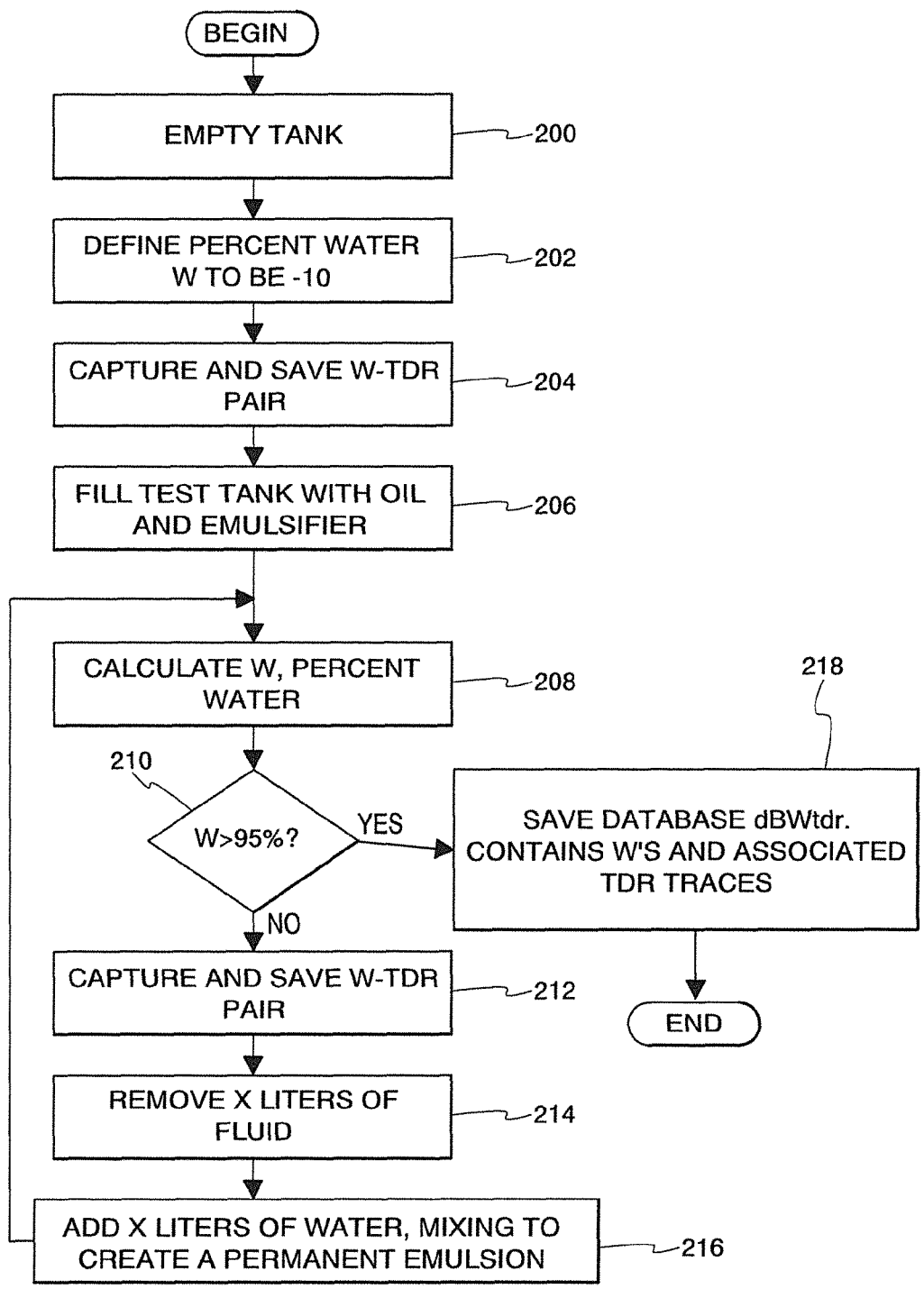
FIG. 6 is a flowchart detailing a method of obtaining a database of known TDR responses.

The first step is to characterize the probe and fluid. The forward model uses these characterizations to estimate a TDR waveform. In a lab-environment, an instrument with a probe is placed into a test tank. The process in FIG. 6 is used to develop a database dBWtdr which contains values for W's and associated TDR traces. The process begins with the tank empty, i.e., nothing but air, at a block 200. The percent water W is defined to be −10 at a block 202. The process captures and stores the TDR trace in the database at a block 204. The tank is then filled with oil plus emulsifier at a block 206. Polyglyceryl Oleate may be used, for example, because it works with small concentrations, is non-toxic, and produces stable emulsions with test oil. The percentage of water W, initially zero, is calculated at a block 208. A decision block 210 determines if W>95%. If not, then the process captures and stores the TDR trace and the value W in the database at a block 212. X liters of fluid are removed at a block 214 and X liters of water are added at a block 216. This increases the percent water. A key requirement is that the tank be mixed thoroughly at all times, so that the oil/water percentage is constant. The process loops back to the block 208 and repeats this loop until W>95%. The database is then saved in memory at a block 218. It is important to take the TDR waveforms right after the mixing, because in time the oil and water will begin to separate and provide less accurate results.

The database dBWtdr is subsequently used to model each segment of the probe by comparing the measured TDR signal to the stored database to match the reflected signal for the segment to a W-TDR pair in the database to represent the percent water at that segment of the probe.

Figure 7:
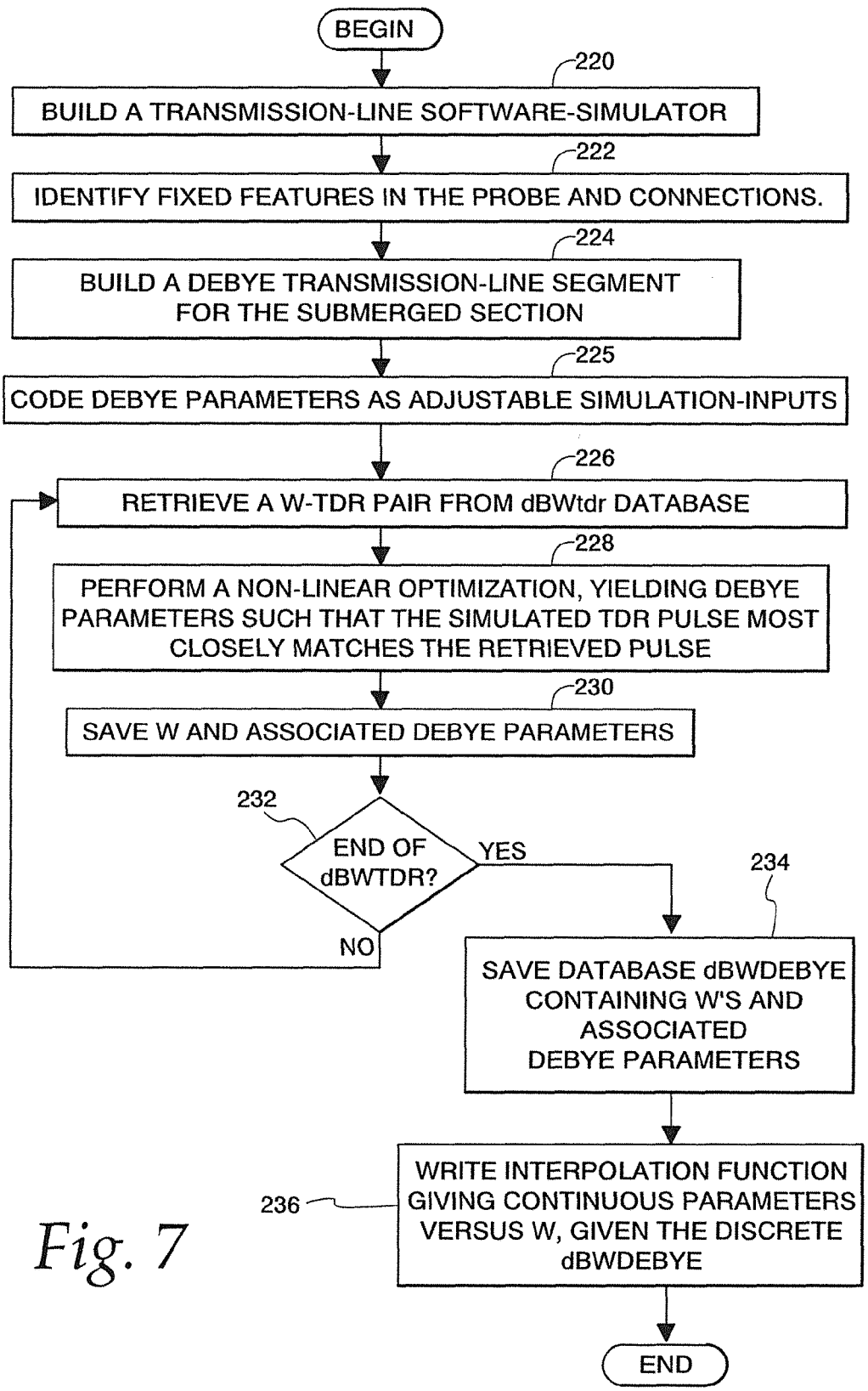
FIG. 7 is a flowchart detailing a method of obtaining a transmission line model.

Next, it is necessary to determine fixed parameters and fluid dependent Debye parameters for each of the captured TDR traces obtained in FIG. 6. The parameters include fixed parameters, related to the probe and instrument characteristics, and also water dependent Debye-model parameters $\{\in_\infty, A, \tau\}$ to account for the fluid's dielectric effects. This is done using the process of FIG. 7.

A transmission line software simulator is built at a block 220. Fixed features, such as a connector and fiducial and the like, are identified at a block 222. A Debye transmission line segment for the submerged section is built at a block 224. The Debye parameters are coded as adjustable simulation inputs at a block 226. At a block 228 a W-TDR pair is recalled from the database dBWTDR 507. A block 228 uses the Nelder-Mead optimization algorithm from Wright, M. H. (2012), "Nelder, Mead, and the Other Simplex Method", *Documenta Mathematica•Extra Volume ISMP*, 271-276, to find the best $\{\in_\infty, A, \tau\}$ in the sense that the simulated TDR waveform most closely matches the measured TDR waveform. A block 230 saves the value W and the associated Debye parameters and a decision block 232 determines if the Debye parameters have been derived far all W values. If not, then the process loops back to the block 226. Once completed, then a block 234 saves the database dBWdebye, which relates a fluid's percent water W to the Debye parameters $\{\in_\infty, A, \tau\}$.

Figure 13:
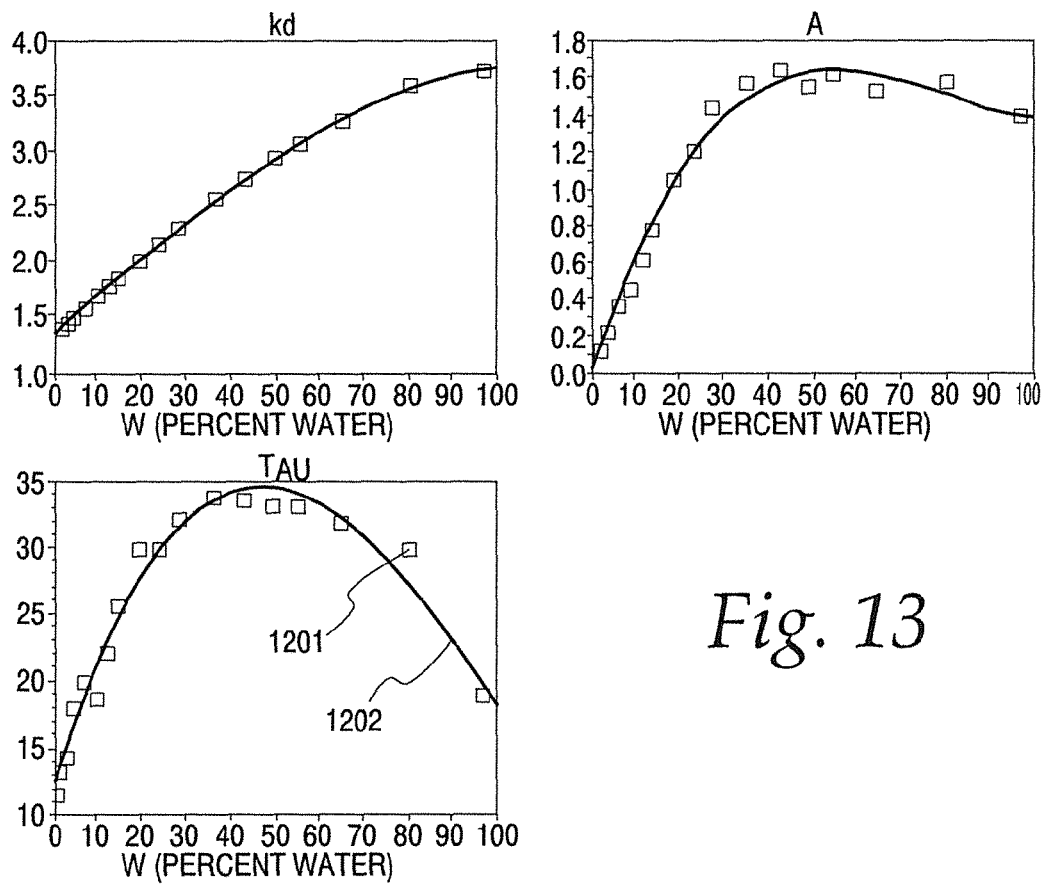
FIG. 13 comprises curves illustrating discrete Debye parameters versus percent water, with interpolation.

The database dBWdebye is then used to build a desired function F(W) at a block 236. The process interpolates between the discrete points of dBWDebye, as seen in FIG. 13. The points 1201 are records from the dBWdebye database. The smooth, continuous line 1202 is interpolated between the points 1201. There are many methods of interpolation. Shown here is third-order-polynomial interpolation.

The FIG. 13 X axis spans fluids of pure oil, through emulsions, up to pure water. This is extended to the region between air and oil by a linear interpolation. The first element in dBWdebye has W=−10, which is defined to be air, and the second element in dBWdebye has W=0, which is oil with zero water. With two points, linear interpolation is trivial between them.

The processes discussed above relative to FIGS. 6 and 7 take place in a lab environment to build the database. The discussion below relates to actual operation of the instrument 20 with the signal processing circuit 46, see FIG. 2. The stored database is used by the forward model simulator 110, see FIG. 4. The model determination module 112 sends a candidate model to the forward model simulator 110. The model is a list of percentages of water, W(i), 120. The model determination module 112 obtains a determination of quality from the measured/simulated comparison module 108.

For emulsion measurement and profiling, the controller 30 models the actual fluid filled vessel V as a plurality of small segments of fluid 120, shown in FIG. 5. The algorithm implemented in the controller 30 uses the model determination module 112 to adjust the percent water W(i) in each segment 120 in such a way to more closely match the actual received pulse from reflection measurement device 106 to the simulated pulse output from forward model simulator 110. The measured/simulated comparison module 108 compares iterations of the simulated pulse output to the actual received pulse, for each segment 120, to obtain the closest match. Once the closest match is obtained, then the particular simulated pulse used to obtain the match, which corresponds with a value W(i), is used to estimate percentage of water in that segment 120, as described more particularly below.

Figure 8:
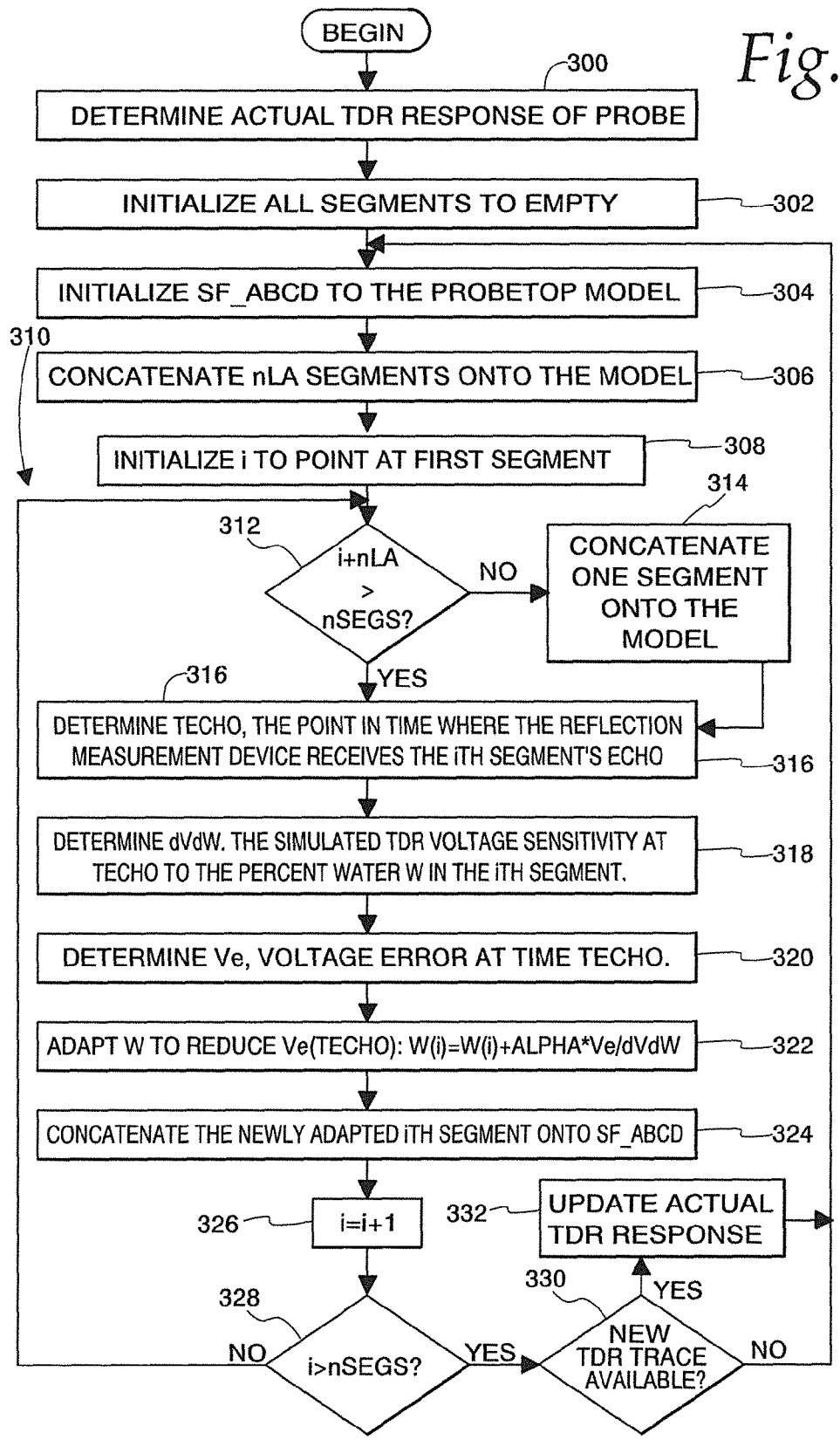
FIG. 8 is a flowchart detailing a search method used for emulsion detection and profiling.
Figure 9:
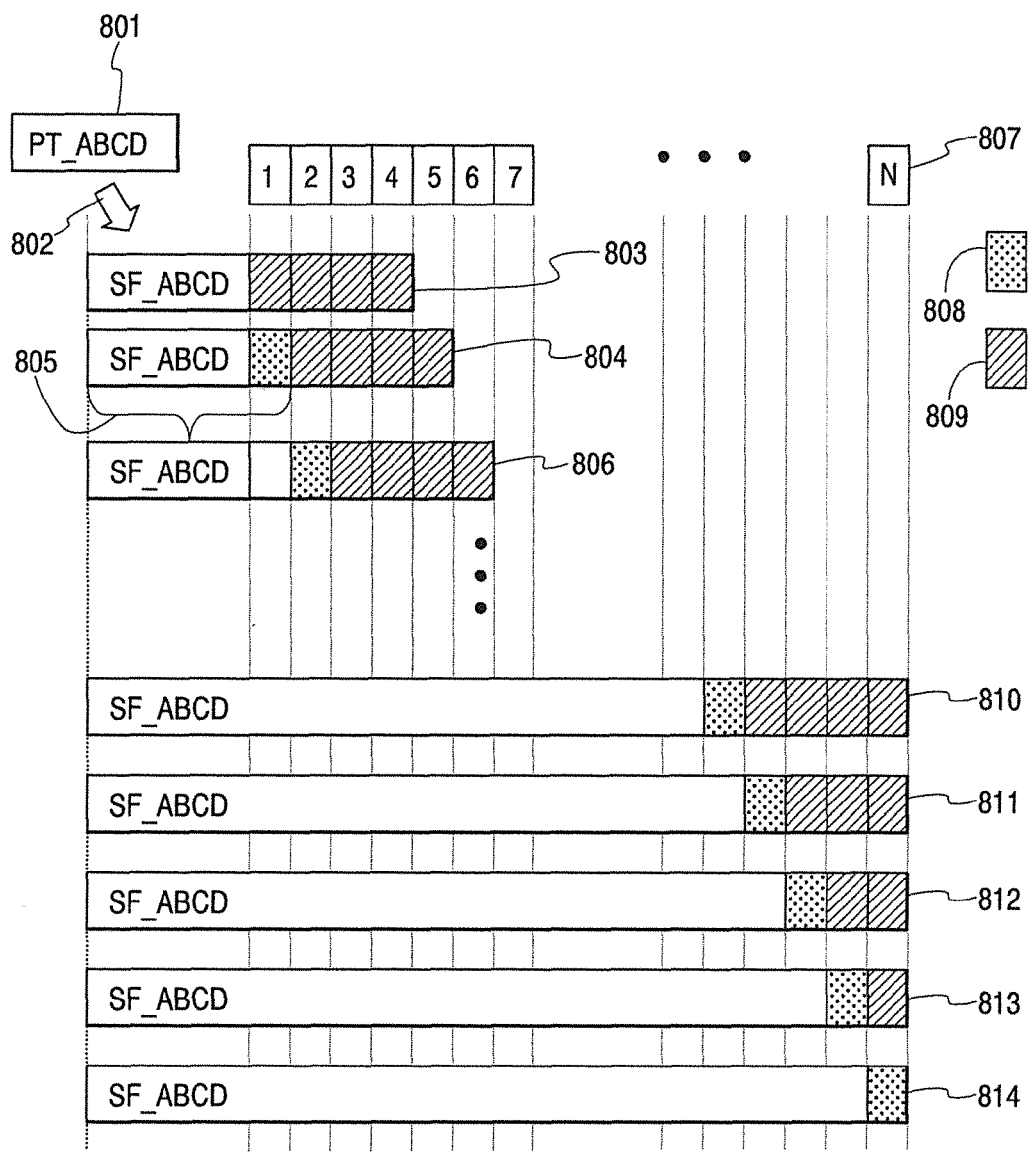
FIG. 9 is a model concatenation process diagram.

FIG. 8 is a flow diagram illustrating operation of the algorithm used by the microprocessor 36 for emulsion measurement and profiling. The flow chart illustrates how the algorithm "builds" a model segment by segment, as shown in FIG. 9, to replicate the received TDR signal, as the algorithm concatenates and adapts the plural segments.

The algorithm begins at a block 300 which generates and transmits a signal on the probe 24 and receives a reflected TDR signal, as discussed above. This represents the actual TDR response of the probe 24 in the emulsion, and other liquid. All segments in the model are initialized to "empty" at a block 302. For each new trace of the probe 24, the model, designated SF_ABCD, is initialized to use the fixed parameters for the probe top model 118, see FIG. 5, at a block 304. nLA segments are concatenated to the model at a block 306. nLA is the number of segments, which is four in the example of FIG. 12, discussed above. A value "i" is initialized to point at the first segment at a block 308. Following this a loop 310 is repeated until the model is completed for the TDR response trace.

The loop 310 begins at a decision block 312 which determines if i+nLA is greater than a value nSegs? If not then a segment is concatenated onto the model at a block 314. Thereafter, or if the value is greater than nSegs, then a point in time "Techo", discussed below, is determined at a block 316. A block 318 determines a value dVdW. This is a simulated TDR voltage sensitivity at Techo to the percent water in the ith segment. A block 320 determines a value Ve which is a voltage error at the time Techo. The algorithm adapts W to reduce Ve at time Techo. The newly adapted ith segment is concatenated onto the model SF_ABCD at a block 324.

A block 326 increments the value i by one. A decision block determines if i>nSegs. If not, then the algorithm loops back to the block 312 to repeat the loop 310. If i>nSegs, then a decision block 330 determines if a new TDR trace is available. If so, then the actual TDR response is updated at a block 332. Thereafter, or if a new trace is not available, then the algorithm loops back to the block 304.

The operation of the algorithm for emulsion measurement and profiling is described below using FIGS. 9 and 10 to illustrate how the model is built.

In FIG. 9, PT_ABCD is the model for the probe top model 118, see FIG. 5. Segment indices 807 enumerate the segments 120 to be used in the model SF+ABCD. FIG. 12 shows segments 120 as ABCD matrices 1102, and the driving impedance 104, see FIG. 4, as matrix 1103. PT_ABCD is a fixed ABCD model including all of the cabling and connection impedances and discontinuities between the driving impedance 104 and the probe 24. FIG. 9 illustrates, using exemplary segment models 803, 804, 806 . . . 812, 813, 814 how the flowchart of FIG. 8 loops and concatenates one segment each trip around the loop 310. Once all segments have been concatenated, the algorithm has made one full pass through the segments, and has a new model W(i) 120.

The arrow 802 indicates the copying of PT_ABCD 801 to SF_ABCD at the block 304 of FIG. 8, and then model 803 shows the nLA segments with formatting 809 concatenated onto the model. SF_ABCD is an ABCD matrix which contains the concatenation of all probe sections that have been concatenated onto the model at that point in the process. This is illustrated by the SF_ABCD matrix covering more and more of the segment indices 807. At each step the model SF_ABCD gets wider, indicating that it now includes an additional segment of length {l}. The segments with formatting 809 are "look ahead" segments, and there are nLA of them, with nLA being four in FIG. 9. These are segments built using the W(i)'s from the last pass. Their main purpose is to "push-off" the end of probe, away from the segment with formatting 808. This is useful because the end of probe is a very large transition which can affect nearby segments, and the look ahead segments prevent interference. Conceptually the end of probe is in the future compared to the ith adapting segment, so there can be no interference. In practice, the algorithm uses linear filtering which combines the segments one into another.

Figure 10:
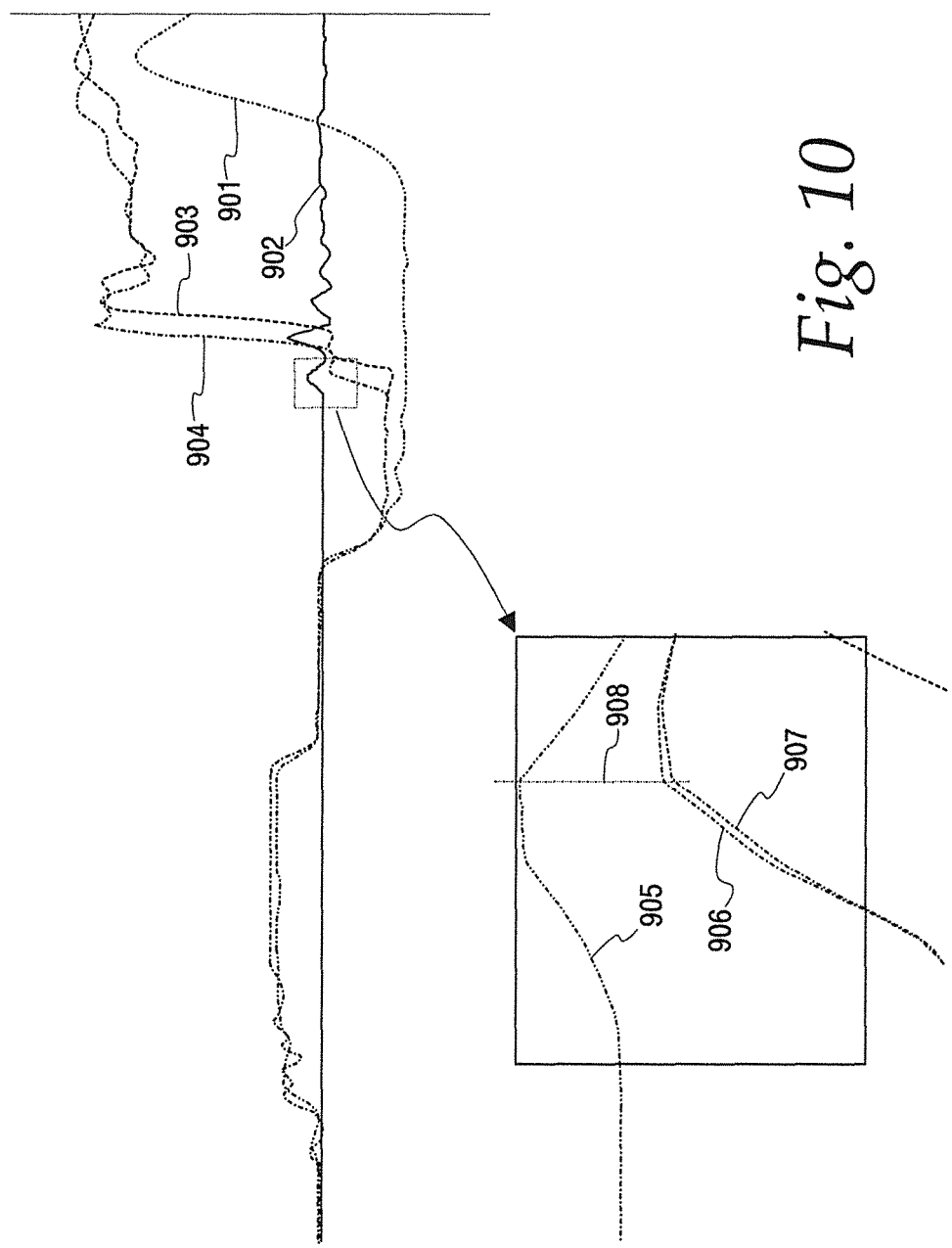
FIG. 10 is a plot of physical and simulated waveforms.

FIG. 10 illustrates the various measured and simulated signals at an arbitrary point while performing the loop 310 in FIG. 8. The reflection measurement device 106 outputs target 901. The forward model simulator 110 outputs 903 and 904, zoomed-in as 906 and 907. At the block 316, the algorithm has built the model 804, and is working on adapting the segment with 808 formatting. The block 316 determines the time Techo, seen in FIG. 10 at 908.

Techo is an important quantity because the algorithm is a closed-loop feedback system, as seen in FIG. 4 by connections between the blocks 112, 110, 108, and back to 112. Techo identifies the point in time in the TDR waveform which a segment relates to. When the model determination module 112 adjusts a segment's value W, it needs to be looking at the proper point in time where that segment has an effect. For example, if the module 112 was to base its model determination on a time before the true Techo, it would find that the segment has very small effect, and would compensate for that by making very large adjustments, making the loop unstable.

The model determination module 112 implements the function of the block 316 by simulating the TDR signal twice. The first simulation is with the most recent model, and the second simulation is with the ith segment (formatted as 808) perturbed by a small amount. FIG. 10 at 904 shows the two simulations overlaid, and 906 and 907 show a zoom-in, to illustrate the difference. The curve 902, zoomed-in as 905, is the amplified difference between 906 and 907. It will be noticed that there is no difference at all until the echo from this perturbation returns. At some point the trace 906 diverges from 907, and then they come back together. The perturbed segment W(i) causes this divergence, and the traces come back together because of the nLA segments after W(i), which are not perturbed. This behavior forms a pulse on the difference trace 905. Looking at the zoomed-out version of trace 905, which corresponds to the trace 902, it will be seen that there are more pulses, after the first pulse. These additional pulses are due to discontinuities creating echoes, and those echoes must pass back through the perturbed segment W(i). Therefore, the echoes will not be identical, and the difference trace 902 will show fluctuations and pulses wherever there is post perturbation activity in the TDR traces 906 and 907.

The algorithm defines the desired time value Techo, 908, as the location of the peak of the first pulse in the trace 902. The block 318 uses the value of trace 905 at time Techo 908 as a sensitivity dVdW in volts per percent water. This determines the affect of adjusting a segment by one percent water on how many volts might be expected to move the simulated TDR waveform at time Techo.

The block 320 calculates the error Ve as the difference between the target 901 to the simulation 904 at time Techo 908. The block 322 uses the sensitivity from the block 318 and the error from the block 320 to adapt the segment W(i) in such a way so that the simulation will be closer to the target. This is done using the formula:

$$W(i) = W(i) + \text{alpha} \times \frac{Ve}{dVdW}$$

The value alpha is an adaptation gain, which can be adjusted to keep the feedback loop stable. The lower this gain, the more passes through the block 330 will be required for the W(i)'s to approach steady-state. The present implementation has shown stability with alpha equal to one.

At this point in the process, the algorithm has a new, better estimate for the percent water W(i) in the ith segment. The algorithm models a segment with that new W(i), and concatenate it onto SF_ABCD, as seen in FIG. 9 at 805. FIG. 9 at 806 shows that the model SF_ABCD now covers a distance farther down the probe, and is then ready to move to the next segment. This illustrates the algorithm's "layer peeling" nature. Once the algorithm determines a value W(i), it is included in the SF_ABCD model, and in a way has peeled it off, revealing what lies below.

The algorithm proceeds as described, adapting each of the segments 120, one after the next, until it has adapted the last segment, shown as 814. At that time, the loop 310 takes the path to the decision block 330, which checks to see if the reflection measurement device 106 has an updated target TDR trace. If so, the algorithm takes that as the new target 901 and continues its adaptation back at the first segment. If no new target is available, the algorithm simply retains the existing target 901, and takes another pass through the adaptation. The software implementation must be designed to be fast enough that it performs the loop 310 several times before the fluid in the tank changes appreciably, so that the adaptation can keep up with the actual tank contents. The end result is to provide W(i) to the user via the output device 114 of FIG. 4.

Particularly, once the modeling has been completed and the emulsion profiled, then the controller 30 determines the levels in the tank for the upper level A, the emulsion top B and the emulsion bottom/water level C, and the percent water at particular level locations in the emulsion E. This information is sent to the output device 114, see FIG. 4, which may be a local or remote display device or may be a supervisory device or host system, as necessary or desired. This information can then be used by an operator to further control the overall process, as is apparent.

It will be appreciated by those skilled in the art that there are many possible modifications to be made to the specific forms of the features and components of the disclosed embodiments while keeping within the spirit of the concepts disclosed herein. Accordingly, no limitations to the specific forms of the embodiments disclosed herein should be read into the claims unless expressly recited in the claims. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

As is apparent, the functionality of the signal processing circuit 46, as well as other analog circuits, could be implemented in the microprocessor 36, or any combination thereof. Accordingly, the illustrations support combinations of means for performing a specified function and combinations of steps for performing the specified functions. It will also be understood that each block and combination of blocks can be implemented by special purpose hardware-based systems which perform the specified functions or steps, or combinations of special purpose hardware and computer instructions.

The invention claimed is:

1. A radar transmitter for emulsion measurement comprising:
   a probe defining a transmission line for sensing impedance;
   a pulse circuit connected to the probe for generating pulses on the transmission line and receiving a reflected signal from the transmission line, the reflected signal comprising a waveform of probe impedance over time; and
   a controller operatively connected to the pulse circuit, the controller profiling content of the emulsion responsive to the waveform by transforming the waveform into impedance relative to distance, converting the transformed waveform into effective dielectric relative to distance, determining mixture content of the emulsion at select distances responsive to the effective dielectric at the select distances and developing an output representing mixture content relative to level units.

2. The radar transmitter of claim 1 wherein the waveform comprises a time domain reflectometry signal.

3. The radar transmitter of claim 2 wherein the controller uses TDR inversion to transform the waveform into impedance relative to distance.

4. The radar transmitter of claim 1 wherein the controller uses a Debye relaxation model to determine electrical properties of the emulsion.

5. The radar transmitter of claim 1 wherein the controller models the probe as a plurality of small segments of fluid and uses a model determination module to adjust percent water in each segment to closely match the reflected signal to a simulated pulse output from a forward model simulator.

6. The radar transmitter of claim 5 wherein a comparison module compares iterations of the simulated pulse output to the actual reflected signal for each segment to obtain a closest match.

7. The radar transmitter of claim 6 wherein once the closest match is obtained, then the particular simulated pulse used to obtain the closest match is used to estimate percentage of a known liquid in that segment.

8. The radar transmitter of claim 1 wherein the controller builds a model, segment by segment, to replicate the reflected signal as the algorithm concatenates and adapts the plural segments.

9. The radar transmitter of claim 8 wherein the plural segments are each characterized by a time value and percent of a known liquid in the segment.

10. The radar transmitter of claim 8 wherein each segment is represented by a two-port network matrix for the transmission line.

11. The radar transmitter of claim 5 wherein the controller iteratively adjusts percent of a known liquid in each segment to minimize an error between the reflected signal and the simulated pulse output at a select time during the segment.

12. A time domain reflectometry measurement instrument for emulsion measurement comprising:
a probe defining a transmission line for sensing impedance;
a pulse circuit connected to the probe for generating pulses on the transmission line and receiving a reflected signal from the transmission line;
a signal processing circuit connected to the pulse circuit for developing a time representation of the reflected signal;
a database storing data representing percentage mixtures of fluids in an emulsion and corresponding electrical properties of the emulsion; and
a controller operatively connected to the signal processing circuit and the database, the controller modeling the probe as a plurality of small segments of fluid and uses a model determination module to adjust percentage mixtures of fluids in each segment and use the corresponding electrical properties to develop a simulated waveform to closely match the reflected signal to determine mixture content of the emulsion at select distances and develop an output representing mixture content relative to level units.

13. The time domain reflectometry measurement instrument of claim 12 wherein the controller uses a Debye relaxation model to determine electrical properties of the emulsion.

14. The time domain reflectometry measurement instrument of claim 12 wherein a comparison module compares iterations of the simulated waveform the reflected waveform for each segment to obtain a closest match.

15. The time domain reflectometry measurement instrument of claim 14 wherein once the closest match is obtained, then the particular simulated waveform for that segment used to obtain the closest match is used to estimate percentage of a known liquid in that segment.

16. The time domain reflectometry measurement instrument of claim 12 wherein the controller builds a model, segment by segment, to replicate the reflected waveform as an algorithm concatenates and adapts the plural segments.

17. The time domain reflectometry measurement instrument of claim 16 wherein the plural segments are each characterized by a time value and percent of a known liquid in the segment.

18. The time domain reflectometry measurement instrument of claim 12 wherein each segment is represented by a two-port network matrix for the transmission line.

19. The time domain reflectometry measurement instrument of claim 12 wherein the controller iteratively adjusts percent of a known liquid in each segment to minimize an error between the reflected waveform and the simulated waveform at a select time during the segment.

20. A time domain reflectometry measurement instrument for emulsion measurement comprising:
a probe defining a transmission line for sensing impedance;
a pulse circuit connected to the probe for driving the probe through a driving impedance;
a reflection measurement device receiving a reflected signal from the probe representing impedance changes on the transmission line;
a forward model simulator developing a simulated pulse output representing estimate of probe outputs for percentage mixtures of fluids;
a comparison module operatively connected to the reflection measurement device and the forward model simulator for comparing iterations of the reflected signal to the simulated pulse output to obtain a closest match for plural segments of the probe; and
a model determination module operatively associate with the comparison module to determining mixture content of the emulsion at select distances and developing an output representing mixture content relative to level units.

21. The time domain reflectometry measurement instrument of claim 20 wherein the model determination module adjusts percentage mixtures of fluids in each segment and uses corresponding electrical properties to develop a simulated waveform to the forward model simulator.

22. The time domain reflectometry measurement instrument of claim 20 wherein the controller uses a Debye relaxation model to determine electrical properties of the emulsion.

23. The time domain reflectometry measurement instrument of claim 20 wherein the model determination module builds a model, segment by segment, to replicate the reflected signal using an algorithm that concatenates and adapts the plural segments.

24. The time domain reflectometry measurement instrument of claim 23 wherein the plural segments are each characterized by a time value and percent of a known liquid in the segment.

25. The time domain reflectometry measurement instrument of claim 20 wherein each segment is represented by a two-port network matrix for the transmission line.

26. The time domain reflectometry measurement instrument of claim 20 wherein the model determination module iteratively adjusts percent of a known liquid in each segment to minimize an error between the reflected signal and the simulated pulse output at a select time during the segment.

27. A method for measuring and profiling mixture content of an emulsion in a process vessel comprising:
providing a probe defining a transmission line extending into the process vessel for sensing impedance of an emulsion in the process vessel;
generating pulses on the transmission line and receiving a reflected signal from the transmission line, the reflected signal comprising a waveform of probe impedance over time; and
operating a controller, receiving the reflected signal, the controller profiling content of the emulsion responsive to the waveform by transforming the waveform into impedance relative to distance, converting the transformed waveform into effective dielectric relative to distance, determining mixture content of the emulsion at select distances responsive to the effective dielectric at the select distances and developing an output representing mixture content relative to level units.

28. The method of claim 27 comprising using TDR inversion to transform the waveform into impedance relative to distance.

29. The method of claim 27 comprising using a Debye relaxation model to determine electrical properties of the emulsion.

30. The method of claim 27 further comprising modeling the probe as a plurality of small segments of fluid and using a model determination module to adjust percent of a known liquid in each segment to closely match the reflected signal to a simulated pulse output from a forward model simulator.

31. The method of claim 27 further comprising comparing iterations of the simulated pulse output to the actual reflected signal for each segment to obtain a closest match.

32. A method for measuring and profiling mixture content of an emulsion in a process vessel using time domain reflectometry comprising:
 providing a probe defining a transmission line extending into the process vessel for sensing impedance of an emulsion in the process vessel;
 driving the probe through a driving impedance;
 receiving a reflected signal from the probe representing impedance changes on the transmission line;
 developing a simulated pulse output representing estimate of probe outputs for percentage mixtures of fluids;
 comparing iterations of the reflected signal to the simulated pulse output to obtain a closest match for plural segments of the probe; and
 determining mixture content of the emulsion at select distances and developing an output representing mixture content relative to level units.

33. The method of claim 32 wherein determining mixture content comprises adjusting percentage mixtures of fluids in each segment and using corresponding electrical properties to develop a simulated waveform used to develop the simulated pulse output.

34. The method of claim 32 comprising using a Debye relaxation model to determine electrical properties of the emulsion.

35. The method of claim 32 wherein determining mixture content comprises building a model, segment by segment, to replicate the reflected signal using an algorithm that concatenates and adapts the plural segments.

36. The method of claim 35 wherein the plural segments are each characterized by a time value and percent of a known liquid in the segment.

37. The method of claim 32 wherein determining mixture content comprises iteratively adjusting percent of a known liquid in each segment to minimize an error between the reflected signal and the simulated pulse output at a select time during the segment.

* * * * *